(12) United States Patent
Nishimura et al.

(10) Patent No.: US 10,955,046 B2
(45) Date of Patent: Mar. 23, 2021

(54) CONTROL DEVICE

(71) Applicant: AISIN AW CO., LTD., Anjo (JP)

(72) Inventors: Keisuke Nishimura, Kariya (JP); Yoichi Tajima, Anjo (JP); Kazuomi Okasaka, Nagoya (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/623,572

(22) PCT Filed: Aug. 27, 2018

(86) PCT No.: PCT/JP2018/031546
§ 371 (c)(1),
(2) Date: Dec. 17, 2019

(87) PCT Pub. No.: WO2019/044756
PCT Pub. Date: Mar. 7, 2019

(65) Prior Publication Data
US 2020/0370641 A1  Nov. 26, 2020

(30) Foreign Application Priority Data
Aug. 28, 2017 (JP) .............................. JP2017-163383

(51) Int. Cl.
*F16H 61/02* (2006.01)
*F04B 49/06* (2006.01)
*F16H 61/00* (2006.01)

(52) U.S. Cl.
CPC ......... *F16H 61/0204* (2013.01); *F04B 49/06* (2013.01); *F16H 61/0031* (2013.01); *F16H 61/0206* (2013.01); *F04B 2203/0207* (2013.01)

(58) Field of Classification Search
CPC ............. F16H 61/0204; F16H 61/0031; F16H 61/0206; F16H 61/02; F04B 49/06;
(Continued)

(56) References Cited

U.S. PATENT DOCUMENTS 6,253,137 B1 * 6/2001 Abo .................. B60K 6/543
701/51
8,729,845 B2 * 5/2014 Kunzel .................. H02P 6/10
318/400.35
(Continued)

FOREIGN PATENT DOCUMENTS

DE  10 2011 086 572 A1  5/2012
DE  10 2011 085 551 A1  8/2012
(Continued)

OTHER PUBLICATIONS

Mar. 4, 2020 Extended European Search Report issued in European Patent Application No. 18852076.1.
(Continued)

*Primary Examiner* — Dirk Wright
(74) *Attorney, Agent, or Firm* — Oliff PLC

(57) ABSTRACT

A control device that includes an electronic control unit that is configured to perform, when specific control that causes a change in a state of a hydraulic circuit in the hydraulic control device that involves an increase in hydraulic pressure at the discharge port is performed in a state in which a rotational speed of the electric motor is a first rotational speed, torque increase control that controls drive of the electric motor such that torque of the electric motor starts to increase before hydraulic pressure at the discharge port increases by the specific control.

20 Claims, 9 Drawing Sheets

(58) Field of Classification Search
CPC ...... F04B 2203/0207; F04B 2203/0209; F04B 2205/02; F04B 49/20
See application file for complete search history.

(56) References Cited

U.S. PATENT DOCUMENTS

| | | | |
|---|---|---|---|
| 9,109,692 B2* | 8/2015 | Jeong | F04B 49/20 |
| 9,989,148 B2* | 6/2018 | Ogata | F16H 61/0021 |
| 10,690,129 B2* | 6/2020 | Paulus | F04D 15/0088 |
| 10,746,171 B2* | 8/2020 | Komori | F04B 49/20 |
| 2006/0223670 A1 | 10/2006 | Nishikawa et al. | |
| 2009/0118878 A1* | 5/2009 | Park | B60K 6/48 |
| | | | 701/22 |
| 2012/0217917 A1 | 8/2012 | Kunzel et al. | |
| 2013/0251540 A1 | 9/2013 | Paulus et al. | |
| 2019/0048899 A1* | 2/2019 | Hirai | F04B 49/20 |

FOREIGN PATENT DOCUMENTS

| | | |
|---|---|---|
| DE | 10 2012 009 136 A1 | 11/2013 |
| EP | 1 965 083 A1 | 9/2008 |
| JP | 2000-27763 A | 1/2000 |
| JP | 2004-166436 A | 6/2004 |
| JP | 2006-308077 A | 11/2006 |
| JP | 2007-290656 A | 11/2007 |

OTHER PUBLICATIONS

Nov. 13, 2018 International Search Report issued in International Patent Application No. PCT/JP2018/031546.

* cited by examiner

CONTROL DEVICE

BACKGROUND

The present disclosure relates to a control device whose control target is an oil supply device including a motor-driven oil pump and a hydraulic control device.

As a control scheme for an electric motor, there is known a sensorless control scheme performed based on an estimated rotational position or an estimated rotational speed. JP 2004-166436 A discloses a technique for preventing, when such sensorless control scheme is applied to control of an electric motor that drives a motor-driven oil pump, loss of synchronism of the electric motor. Specifically, JP 2004-166436 A describes a problem that when a change in load due to foreign matter, an instrumental error, etc., occurs in a situation in which an electric motor is driven by current feedback control, motor terminal voltage decreases and thus the rotational speed decreases, by which induced voltage decreases and the electric motor loses its synchronism (paragraphs 0006 and 0007). To solve such a problem, a control device described in JP 2004-166436 A is configured such that when the rotational speed of the electric motor has reached lower than or equal to a predetermined rotational speed in a situation in which the electric motor is driven by current feedback control, the control device switches control from the current feedback control to rotational speed control. By performing such switching, even when the rotational speed decreases due to a change in load, a drop in the rotational speed of the electric motor is prevented, enabling to prevent loss of synchronism of the electric motor (paragraphs 0045 and 0046).

SUMMARY

Meanwhile, an increase in the load of the electric motor that drives the motor-driven oil pump can occur not only due to the influence of foreign matter or instrumental errors assumed in JP 2004-166436 A, but also due to an increase in hydraulic pressure at a discharge port of the motor-driven oil pump which is associated with a change in the state of a hydraulic circuit in a hydraulic control device. Depending on the degree or speed of the increase in hydraulic pressure at the discharge port of the motor-driven oil pump, there is a possibility that before a decreasing rotational speed of the electric motor is increased by increasing output torque, the rotational speed of the electric motor decreases to a rotational speed range in which stable drive of the electric motor by sensorless control becomes difficult. However, JP 2004-166436 A does not describe this point.

Hence, it is desired to implement a control device capable of continuing stable drive of an electric motor by sensorless control even in a situation in which hydraulic pressure at a discharge port of a motor-driven oil pump increases with a change in the state of a hydraulic circuit in a hydraulic control device.

A characteristic configuration of a control device in view of the above description whose control target is an oil supply device including a motor-driven oil pump driven by an electric motor; and a hydraulic control device that controls hydraulic pressure of oil discharged from a discharge port of the motor-driven oil pump, and supplies the oil to a vehicle drive transmission device, the control device driving the electric motor by sensorless control performed based on an estimated rotational position or an estimated rotational speed, the control device including an electronic control unit that is configured to perform, when specific control that causes a change in a state of a hydraulic circuit in the hydraulic control device that involves an increase in hydraulic pressure at the discharge port is performed in a state in which a rotational speed of the electric motor is a first rotational speed, torque increase control that controls drive of the electric motor such that torque of the electric motor starts to increase before hydraulic pressure at the discharge port increases by the specific control.

According to the above-described characteristic configuration, by performing torque increase control when specific control is performed, an increase in the torque of the electric motor can start before the hydraulic pressure at the discharge port of the motor-driven oil pump increases by the specific control. Thus, even when the rotational speed of the electric motor decreases due to an increase in load associated with an increase in hydraulic pressure at the discharge port, the torque of the electric motor increases by performing torque increase control, and accordingly, the amount of reduction in rotational speed can be kept to a minimum. As a result, it can be configured such that even when the rotational speed of the electric motor decreases by specific control, it is difficult for the rotational speed of the electric motor to decrease to a rotational speed range in which stable drive of the electric motor by sensorless control becomes difficult.

As such, according to the above-described characteristic configuration, even in a situation in which the hydraulic pressure at the discharge port of the motor-driven oil pump increases with a change in the state of the hydraulic circuit in the hydraulic control device, it becomes possible to continue stable drive of the electric motor by sensorless control.

Further features and advantages of the control device will become apparent from the following description of an embodiment which will be described with reference to drawings.

DETAILED DESCRIPTION OF EMBODIMENTS

An embodiment of a control device will be described with reference to the drawings. Note that in this specification, a "rotating electrical machine" is used as a concept that includes all of a motor, a generator, and a motor-generator that functions as both a motor and a generator as necessary. In addition, in this specification, the term "drive-coupled" refers to a state in which two rotating elements are coupled to each other such that drive power (synonymous with torque) can be transmitted. This concept includes a state in which two rotating elements are coupled to each other so as to rotate together, and a state in which two rotating elements are coupled to each other through one or more transmission members such that drive power can be transmitted. Such transmission members include various types of members (shafts, gear mechanisms, belts, chains, etc.) that transmit rotation at the same speed or at a changed speed, and may include engagement devices (friction engagement devices, mesh engagement devices, etc.) that selectively transmit rotation and drive power.

Figure 1:
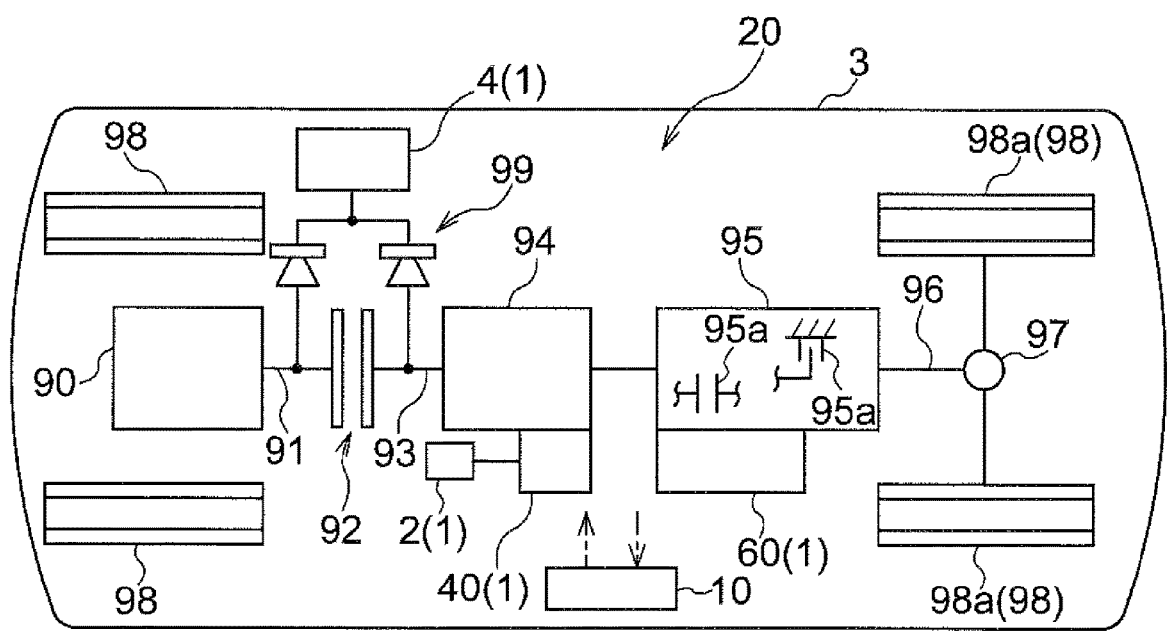
FIG. 1 is a diagram showing a schematic configuration of a vehicle drive transmission device according to an embodiment.

The control device 10 is a control device whose control target is an oil supply device 1. As shown in FIG. 1, the oil supply device 1 to be controlled by the control device 10 includes a motor-driven oil pump 40 which is driven by an electric motor 2; and a hydraulic control device 60 that controls the hydraulic pressure of oil discharged from a discharge port 41 (see FIG. 3) of the motor-driven oil pump 40, and supplies the oil to a vehicle drive transmission device 20. The control device 10 drives the electric motor 2 by sensorless control performed based on an estimated rotational position or an estimated rotational speed.

As shown in FIG. 1, the vehicle drive transmission device 20 according to the present embodiment is provided on a vehicle 3 (hybrid vehicle) including both an internal combustion engine 90 and a rotating electrical machine 94 as drive power sources for wheels 98, and transmits power between the internal combustion engine 90 and the wheels 98 (drive wheels 98a). The vehicle drive transmission device 20 includes an input shaft 91, a clutch 92 (starter clutch), an intermediate shaft 93, the rotating electrical machine 94, an automatic transmission 95, an output shaft 96, and a differential gear device 97 (output differential gear device). The clutch 92, the rotating electrical machine 94, the automatic transmission 95, and the differential gear device 97 are provided in this order from an internal combustion engine 90 side in a power transmission path connecting the internal combustion engine 90 to the drive wheels 98a. They are accommodated in a case whose depiction is omitted.

The input shaft 91 is drive-coupled to the internal combustion engine 90. The input shaft 91 is coupled to an output shaft (a crankshaft, etc.) of the internal combustion engine 90 such that they rotate together, or is drive-coupled to the output shaft of the internal combustion engine 90 through another member such as a damper or a hydraulic coupling (a torque converter, etc.). Note that the internal combustion engine is a prime mover (a gasoline engine, a diesel engine, etc.) that is driven by fuel combustion inside the engine and takes out power.

The clutch 92 is provided in a portion of the power transmission path between the input shaft 91 and the intermediate shaft 93. With the clutch 92 engaged, power is transmitted between the input shaft 91 and the intermediate shaft 93, and with the clutch 92 disengaged, the power transmission between the input shaft 91 and the intermediate shaft 93 is interrupted. The clutch 92 is a hydraulically actuated clutch, i.e., a clutch including a hydraulic servomechanism 64 (see FIG. 3) that operates based on hydraulic pressure supplied thereto. In addition, the clutch 92 is a friction clutch that transmits torque by friction force generated between engaging members (between an input-side engaging member and an output-side engaging member), and is specifically a multiplate wet clutch. Thus, the engagement state of the clutch 92 is controlled to any one of a directly-coupled engaged state in which there is no difference in rotational speed (no slip) between the engaging members, a slip-engaged state in which there is a difference in rotational speed between the engaging members, and a disengaged state, based on hydraulic pressure supplied to the hydraulic servomechanism 64 (a hydraulic oil pressure chamber included in the hydraulic servomechanism 64).

The intermediate shaft 93 is drive-coupled to the rotating electrical machine 94. In the present embodiment, the rotating electrical machine 94 is coupled to the intermediate shaft 93 such that they rotate together. Though depiction is omitted, the rotating electrical machine 94 includes a stator fixed to a case; and a rotor rotatably supported on the stator. For the rotating electrical machine 94, for example, an inner rotor type rotating electrical machine in which a rotor is disposed on an inner side in a radial direction of a stator can be used. The rotating electrical machine 94 is electrically connected to an electrical storage device such as a battery or a capacitor through an inverter device that performs electric power conversion between direct-current electric power and alternating-current electric power. The rotating electrical machine 94 performs motoring by receiving electric power supply from the electrical storage device, or supplies and stores electric power generated by the torque of the internal combustion engine 90, the inertia force of the vehicle 3, etc., in the electrical storage device.

The intermediate shaft 93 is coupled to an input side of the automatic transmission 95, as an input member (transmission input member) of the automatic transmission 95. In addition, the output shaft 96 is coupled to an output side of the automatic transmission 95, as an output member (transmission output member) of the automatic transmission 95. The automatic transmission 95 changes the speed of rotation of the intermediate shaft 93 and transmits the rotation to the output shaft 96. In the present embodiment, the automatic transmission 95 is a stepped automatic transmission capable of forming a plurality of shift speeds with different gear ratios, and changes the speed of rotation of the intermediate shaft 93 at a gear ratio determined based on a formed shift speed, and transmits the rotation to the output shaft 96. Then, the rotation transmitted to the output shaft 96 is transmitted through the differential gear device 97 to the two left and right wheels 98 (drive wheels 98a) in a distributed manner.

As shown in FIG. 1 in a simplified manner, the automatic transmission 95 includes a plurality of transmission engagement devices 95a. Based on the engagement state of each transmission engagement device 95a, any one of the plurality of shift speeds is formed. Specifically, with two or more (e.g., two) of the plurality of transmission engagement devices 95a engaged to each other and others disengaged, each shift speed is formed. For the automatic transmission 95, a planetary gear type transmission mechanism formed using a single or a plurality of planetary gear mechanisms can be used. In this case, by the transmission engagement devices 95a controlling the differential state of each planetary gear mechanism, a shift speed to be formed is changed. For example, the plurality of transmission engagement devices 95a include one or more clutches and one or more brakes. In the present embodiment, the transmission engagement devices 95a each are a hydraulically actuated friction engagement device (a multiplate wet clutch, a multiplate wet brake, etc.), i.e., a friction engagement device including a hydraulic servomechanism 64 (see FIG. 3) that operates based on hydraulic pressure supplied thereto. Thus, the engagement state of each transmission engagement device 95a is controlled to any one of a directly-coupled engaged state, a slip-engaged state, and a disengaged state, based on hydraulic pressure supplied to the hydraulic servomechanism 64.

Next, a configuration of the oil supply device 1 according to the present embodiment will be described with reference to FIGS. 1 and 3. The oil supply device 1 includes the motor-driven oil pump 40 which is driven by the electric motor 2; and the hydraulic control device 60 that controls the hydraulic pressure of oil discharged from the discharge port 41 of the motor-driven oil pump 40, and supplies the oil to the vehicle drive transmission device 20. The electric motor 2 that drives the motor-driven oil pump 40 is a motor provided independently of the power transmission path connecting the internal combustion engine 90 to the wheels 98 (drive wheels 98a). In the present embodiment, the oil supply device 1 includes a mechanical oil pump 4 serving as a second pump, in addition to the motor-driven oil pump 40 serving as a first pump, as oil supply sources for the hydraulic control device 60. Thus, the hydraulic control device 60 controls the hydraulic pressure of oil discharged from one or both of the motor-driven oil pump 40 and the mechanical oil pump 4, and supplies the oil to the vehicle drive transmission device 20.

The mechanical oil pump 4 is a pump driven by power transmitted to the power transmission path connecting the internal combustion engine 90 to the wheels 98 (drive wheels 98a). Namely, the mechanical oil pump 4 is driven by a rotating member included in the vehicle drive transmission device 20. As shown in FIG. 1, in the present embodiment, the mechanical oil pump 4 is coupled to the input shaft 91 and the intermediate shaft 93 through a power source switching mechanism 99. Though details are omitted, the power source switching mechanism 99 includes a one-way clutch interposed between the mechanical oil pump 4 and the input shaft 91; and a one-way clutch interposed between the mechanical oil pump 4 and the intermediate shaft 93. The mechanical oil pump 4 is configured to be driven by one of the input shaft 91 and the intermediate shaft 93 having a higher rotational speed, and discharge oil.

Though depiction is omitted, each of the motor-driven oil pump 40 and the mechanical oil pump 4 includes a suction port connected to an oil sump part (e.g., an oil pan provided at the bottom of a case), and sucks oil collecting in the oil sump part through the suction port and thereby generates hydraulic pressure. For the motor-driven oil pump 40 and the mechanical oil pump 4, internal gear pumps, external gear pumps, vane pumps, etc., can be used.

Figure 3:
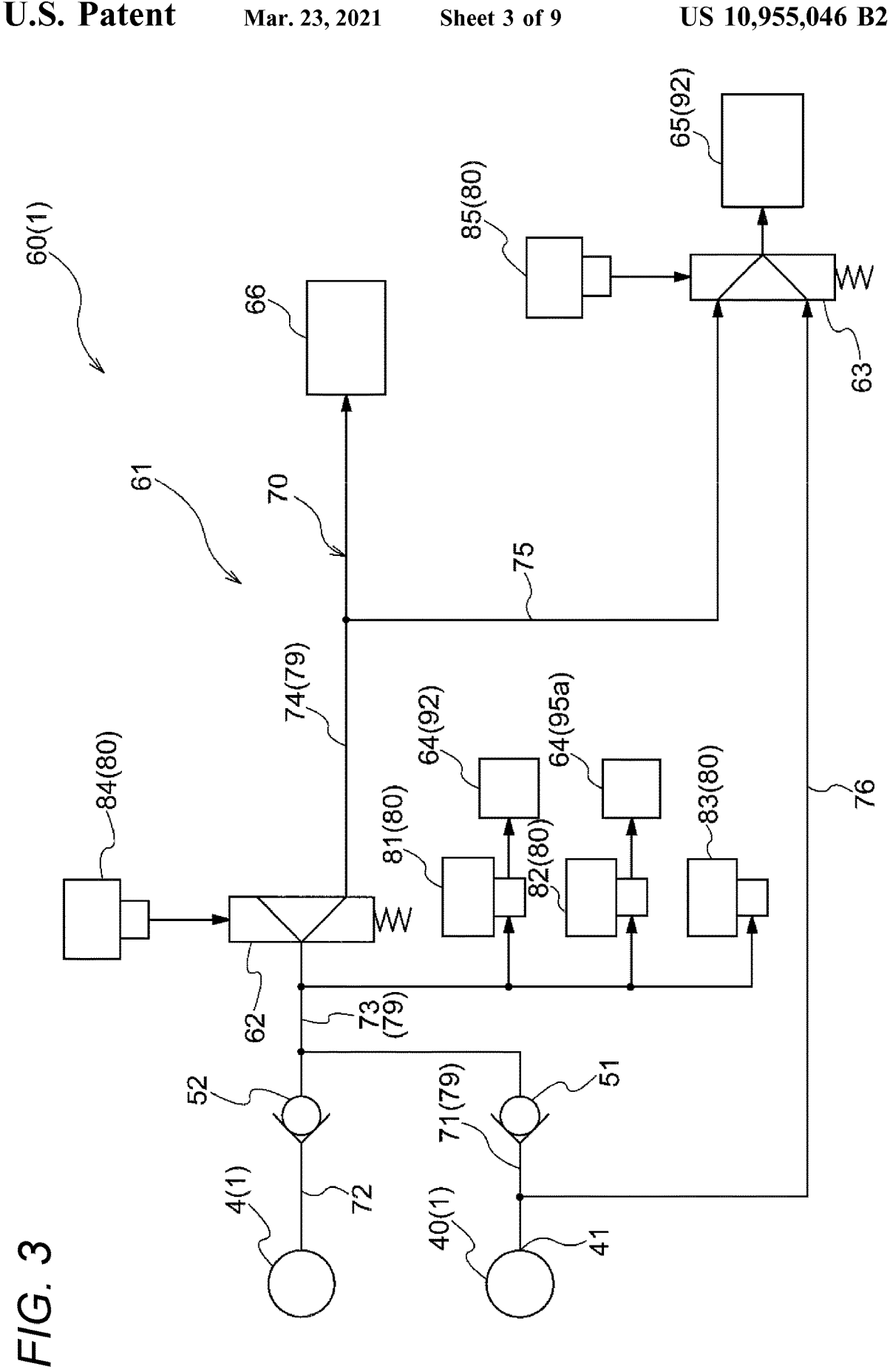
FIG. 3 is a schematic diagram of an oil supply device according to the embodiment.

As shown in FIG. 3, the hydraulic control device 60 includes an oil passage 70 included in a hydraulic circuit 61. In the present embodiment, the oil passage 70 includes a first oil passage 71, a second oil passage 72, a third oil passage 73, a fourth oil passage 74, a fifth oil passage 75, and a sixth oil passage 76. The hydraulic control device 60 includes a plurality of valves (a hydraulic regulating valve 62, a switching valve 63, and solenoid valves 80 which will be described later) provided in the oil passage 70 in the hydraulic circuit 61. By switching the state of each valve, the hydraulic circuit 61 is switched (the flow of oil in the hydraulic circuit 61 is switched). In the present embodiment, the hydraulic control device 60 includes two types of solenoid valves 80: a linear solenoid valve and an on/off solenoid valve. Here, the linear solenoid valve is a solenoid valve that regulates (continuously regulates) hydraulic pressure to be supplied to the downstream side, based on a current applied thereto, and the on/off solenoid valve is a solenoid valve that regulates whether to supply hydraulic pressure to the downstream side (in other words, switches whether to supply hydraulic pressure), based on a current applied thereto. In an example shown in FIG. 3, a first solenoid valve 81, a second solenoid valve 82, and a fourth solenoid valve 84 are linear solenoid valves, and a third solenoid valve 83 and a fifth solenoid valve 85 are on/off solenoid valves. The current passage state of each solenoid valve 80 is controlled by the control device 10 whose details will be described later.

As shown in FIG. 3, an end portion on the upstream side of the first oil passage 71 is connected to the discharge port 41 of the motor-driven oil pump 40, and an end portion on the upstream side of the second oil passage 72 is connected to a discharge port of the mechanical oil pump 4. The first oil passage 71 and the second oil passage 72 which are parallel to each other are connected to the third oil passage 73 disposed on a more downstream side than the first oil passage 71 and the second oil passage 72. Namely, the third oil passage 73 is an oil passage formed by the first oil passage 71 and the second oil passage 72 joining together. The first oil passage 71 is provided with a first check valve 51 that restricts the flow of oil to the upstream side, and the second oil passage 72 is provided with a second check valve 52 that restricts the flow of oil to the upstream side.

The hydraulic regulating valve 62 that regulates hydraulic pressure in the third oil passage 73 to line pressure PL is provided at a connecting portion between the third oil passage 73 and the fourth oil passage 74 disposed on a more downstream side than the third oil passage 73. The hydraulic regulating valve 62 regulates hydraulic pressure in the third oil passage 73 to line pressure PL by emitting part of oil (extra oil) in the third oil passage 73 to the fourth oil passage 74 and a return oil passage whose depiction is omitted (an oil passage through which oil returns to the pumps). The hydraulic regulating valve 62 generates line pressure PL using hydraulic pressure supplied from the fourth solenoid valve 84 as signal pressure. The control device 10 controls the fourth solenoid valve 84 so as to output hydraulic pressure (signal pressure) determined based on target line pressure. The hydraulic regulating valve 62 includes a sleeve in which a plurality of ports (input and output ports) are formed; and a spool (valve body) that swings within the sleeve, and by changing a communication state between the different ports based on the position of the spool, hydraulic pressure (line pressure PL) in the third oil passage 73 is regulated in accordance with the target line pressure. In the present embodiment, the line pressure PL corresponds to "set hydraulic pressure".

When oil discharged from the mechanical oil pump 4 and oil discharged from the motor-driven oil pump 40 join together and are supplied to the third oil passage 73, or when only oil discharged from the motor-driven oil pump 40 is supplied to the third oil passage 73, part of the oil discharged from the discharge port 41 of the motor-driven oil pump 40 is supplied to the fourth oil passage 74 via the first oil passage 71 and the third oil passage 73. Here, when an oil passage formed of the first oil passage 71, the third oil passage 73, and the fourth oil passage 74 (a set of the oil passages) is a discharge oil passage 79, the hydraulic control device 60 includes the discharge oil passage 79 connected to the discharge port 41; and the hydraulic regulating valve 62 provided in the discharge oil passage 79 and regulating hydraulic pressure on the upstream side to line pressure PL by emitting part of oil discharged from the discharge port 41 to the downstream side.

The third oil passage 73 is connected to the hydraulic servomechanism 64 of the clutch 92 through the first solenoid valve 81, and the first solenoid valve 81 regulates line pressure PL based on a current applied thereto, and supplies the line pressure PL to the hydraulic servomechanism 64 of the clutch 92. In addition, the third oil passage 73 is connected to the hydraulic servomechanism 64 of the transmission engagement device 95a through the second solenoid valve 82, and the second solenoid valve 82 regulates line pressure PL based on a current applied thereto, and supplies the line pressure PL to the hydraulic servomechanism 64 of the transmission engagement device 95a. Note that for the hydraulic servomechanisms 64 of the transmission engagement devices 95a, the hydraulic servomechanisms 64, the number of which is the same as the number of the transmission engagement devices 95a, are provided, but FIG. 3 shows a representative one of the hydraulic servomechanisms 64, and shows only the second solenoid valve 82 that supplies hydraulic pressure to the one hydraulic servomechanism 64. The second solenoid valves 82, the number of which is the same as the number of the transmission engagement devices 95a, are provided or the second solenoid valves 82, the number of which is smaller than the number of the transmission engagement devices 95a, are provided. In the latter case, an oil passage switching mechanism (oil passage switching valve) that switches a destination of hydraulic pressure to be supplied between the plurality of transmission engagement devices 95a (the plurality of hydraulic servomechanisms 64) is provided on a more downstream side than the second solenoid valves 82.

In addition, the third oil passage 73 is connected through the third solenoid valve 83 to a hydraulic pressure supply location whose depiction is omitted, and the third solenoid valve 83 regulates (switches) whether to supply line pressure PL to the hydraulic pressure supply location, based on a current applied thereto. The hydraulic control device 60 may be provided with a fail-safe function that prevents a plurality of (e.g., two) transmission engagement devices 95a that form a reverse gear from being simultaneously engaged with each other upon forward traveling. When a reverse gear is formed, the fail-safe function needs to be stopped. For example, the above-described hydraulic pressure supply location to which hydraulic pressure is supplied through the third solenoid valve 83 can serve as a location to which hydraulic pressure is supplied when the fail-safe function is stopped (e.g., a port of a fail-safe valve).

The fourth oil passage 74 is connected to a lubricating oil passage 66 that supplies oil for lubrication and cooling to each part of the vehicle drive transmission device 20. By oil emitted to the fourth oil passage 74 from the hydraulic regulating valve 62, lubrication and cooling of each part of the vehicle drive transmission device 20 are performed. Specifically, by oil supplied to the automatic transmission 95 from the lubricating oil passage 66, lubrication and cooling of gear mechanisms, bearings, etc., included in the automatic transmission 95 are performed. In addition, by oil supplied to the rotating electrical machine 94 from the lubricating oil passage 66, cooling of the rotating electrical machine 94 is performed.

The fifth oil passage 75 branches off from the fourth oil passage 74 and is connected to a lubricating oil chamber 65. In addition, the sixth oil passage 76 branches off from the first oil passage 71 (a portion of the first oil passage 71 on a more upstream side than the first check valve 51) and is connected to the lubricating oil chamber 65. Note that the switching valve 63 that switches between a state in which the fifth oil passage 75 communicates with the lubricating oil chamber 65 and a state in which the sixth oil passage 76 communicates with the lubricating oil chamber 65 is provided between the fifth oil passage 75 and the sixth oil passage 76, and the lubricating oil chamber 65. The switching valve 63 is controlled by hydraulic pressure (signal pressure) supplied from the fifth solenoid valve 85, to switch between the above-described two states. The lubricating oil chamber 65 is an oil chamber that communicates with space in which an engaging member (friction plate) of the clutch 92 is disposed, and the engaging member of the clutch 92 is cooled by oil supplied to the lubricating oil chamber 65.

When the state of the switching valve 63 is a state in which the fifth oil passage 75 communicates with the lubricating oil chamber 65, part of oil emitted to the fourth oil passage 74 from the hydraulic regulating valve 62 is supplied to the lubricating oil chamber 65. Note that in this state the communication between the sixth oil passage 76 and the lubricating oil chamber 65 is interrupted, and thus, oil discharged from the motor-driven oil pump 40 is supplied to the third oil passage 73. At this time, if the mechanical oil pump 4 is also driven, then oil discharged from the motor-driven oil pump 40 and oil discharged from the mechanical oil pump 4 join together and are supplied to the third oil passage 73. On the other hand, when the state of the switching valve 63 is a state in which the sixth oil passage 76 communicates with the lubricating oil chamber 65, oil discharged from the motor-driven oil pump 40 is supplied to the lubricating oil chamber 65 without through the third oil passage 73 in which hydraulic pressure is regulated to line pressure PL. Note that in the present embodiment the valve opening pressure of the first check valve 51, the internal resistance of the switching valve 63, etc., are set such that the first check valve 51 goes into a closed state when the state of the switching valve 63 is a state in which the sixth oil passage 76 communicates with the lubricating oil chamber 65. Thus, in this state, oil discharged from the motor-driven oil pump 40 is basically supplied only to the lubricating oil chamber 65.

Next, a configuration of the control device 10 according to the present embodiment will be described. Note that the control device 10 includes, as a core member, an arithmetic processing unit such as a Central Processing Unit (CPU), and includes storage devices to which the arithmetic processing unit can refer, such as a Random Access Memory (RAM) and a Read Only Memory (ROM). Each function of the control device 10 is implemented by software (program) stored in the storage device such as the ROM, or hardware provided separately such as an arithmetic circuit, or both of software and hardware. The arithmetic processing unit included in the control device 10 operates as a computer that executes each program.

The control device 10 may be formed of a set of a plurality of pieces of hardware (a plurality of separated pieces of hardware) that can communicate with each other. For example, a function of the control device 10 that controls the electric motor 2 and a function of the control device 10 that controls the hydraulic control device 60 may be separately implemented by a plurality of pieces of hardware that can communicate with each other. In addition, when the control device 10 is thus formed of a set of a plurality of pieces of hardware that can communicate with each other, the control device 10 can also be configured such that the control device 10 is separated into vehicle interior devices mounted on the vehicle 3 and vehicle exterior devices provided external to the vehicle 3 and capable of communicating with the vehicle interior devices through a communication network (e.g., the Internet), and at least one of the functions of the control device 10 is provided in a vehicle exterior device.

The control device 10 is configured to perform communication with an integrated control device (not shown) that controls the entire vehicle 3 in an integrated manner, and the control device 10 and the integrated control device are configured so as to share various types of information therebetween and to perform coordination control. The integrated control device is configured to perform communication also with a rotating electrical machine control device that controls the operation of the rotating electrical machine 94 and an internal combustion engine control device that controls the operation of the internal combustion engine 90, in addition to the control device 10. In addition, the integrated control device is configured to be able to obtain information on the results of detection by various types of sensors (e.g., an accelerator pedal position, a vehicle speed sensor, and an oil temperature sensor) included in the vehicle 3. At least a part of the control device 10 may form a part of the integrated control device.

The control device 10 has a function of controlling the hydraulic control device 60. The control device 10 controls hydraulic pressure supplied to the vehicle drive transmission device 20 from the hydraulic control device 60, by controlling the current passage state of each solenoid valve 80 included in the hydraulic control device 60. Specifically, the control device 10 controls the engagement state of the clutch 92 by controlling the current passage state of the first solenoid valve 81. The control device 10 obtains information on a travel mode to be implemented by the vehicle 3 from the above-described integrated control device, etc., and controls the engagement state of the clutch 92 so as to obtain an engagement state appropriate to the travel mode. In addition, the control device 10 controls the engagement states of the transmission engagement devices 95a by controlling the current passage states of the second solenoid valves 82. The control device 10 obtains information on a shift speed (target shift speed) to be formed by the automatic transmission 95 from the above-described integrated control device, etc., and controls the engagement state of each transmission engagement device 95a so as to form the target shift speed.

The control device 10 controls the magnitude of line pressure PL regulated by the hydraulic regulating valve 62, by controlling the current passage state of the fourth solenoid valve 84. The control device 10 obtains information on target line pressure set based on hydraulic pressure required by the vehicle drive transmission device 20, from the above-described integrated control device, etc., and controls hydraulic pressure (signal pressure) supplied to the hydraulic regulating valve 62 from the fourth solenoid valve 84 such that the line pressure PL matches the target line pressure. Note that the control device 10 can also be configured to set target line pressure.

The control device 10 switches, using the switching valve 63, a destination of oil to be supplied that is discharged from the discharge port 41 of the motor-driven oil pump 40, by controlling the current passage state of the fifth solenoid valve 85. In a situation in which oil discharged from the motor-driven oil pump 40 needs to be supplied to an oil passage (third oil passage 73) in which hydraulic pressure is regulated to line pressure PL, the control device 10 switches the state of the switching valve 63 to a state in which the communication between the sixth oil passage 76 and the lubricating oil chamber 65 is interrupted (in the present embodiment, a state in which the fifth oil passage 75 communicates with the lubricating oil chamber 65). In addition, in a situation in which cooling of the clutch 92 is highly necessary and a large amount of oil needs to be supplied to the lubricating oil chamber 65, the control device 10 switches the state of the switching valve 63 to a state in which the sixth oil passage 76 communicates with the lubricating oil chamber 65. A determination as to which one of the two situations corresponds to the current situation is made by a device other than the control device 10, e.g., the above-described integrated control device, or is made by the control device 10.

In addition, the control device 10 has a function of controlling the drive of the electric motor 2. The electric motor 2 is an alternating-current rotating electrical machine driven by alternating-current electric power of a plurality of phases, and for example, an alternating-current rotating electrical machine driven by three-phase alternating-current electric power can be used as the electric motor 2. In addition, as the electric motor 2, a permanent magnet synchronous motor (e.g., a buried-type permanent magnet synchronous motor) can be used. Though depiction is omitted, the electric motor 2 is connected to a direct-current power supply through an inverter that performs electric power conversion between direct-current electric power and an alternating-current electric power, and the control device 10 controls the drive of the electric motor 2 through the inverter.

The control device 10 controls the drive of the electric motor 2 by sensorless control performed based on an estimated rotational position (magnet pole position) or an estimated rotational speed. Namely, the control device 10 has a function of estimating (a function of sensorlessly detecting) a rotational state (magnetic pole position and rotational speed) of the electric motor 2 without using a position sensor (magnetic pole position sensor) or a rotation sensor (speed sensor). Namely, the control device 10 estimates a rotational state (magnetic pole position or rotational speed) of the electric motor 2 without using a sensor for directly detecting the rotational state (a dedicated sensor for detecting the rotational state). In the present embodiment, the electric motor 2 is a synchronous motor (synchronous rotating electrical machine), and the control device 10 estimates a rotational state of the electric motor 2 without using a position sensor. Here, the position sensor is a sensor that detects a rotational position (magnetic pole position) of the rotor, such as a resolver, a sensor using a magneto-resistive element (MR element), or a sensor using a Hall element. In the present embodiment, the control device 10 estimates a rotational state of the electric motor 2, using induced electromotive force generated by rotation of the electric motor 2 (rotation of the rotor). Specifically, the control device 10 obtains a rotational state of the electric motor 2 by computation, based on the ripples of induced electromotive force contained in detection values of currents flowing through stator coils of the respective phases of the electric motor 2 (detection values obtained by a current sensor).

In the present embodiment, a three-phase alternating-current rotating electrical machine is used as the electric motor 2. In the present embodiment, the control device 10 controls the drive of the electric motor 2 by current feedback control using vector control. Specifically, the control device 10 derives target torque, based on a target rotational speed of the electric motor 2 and an estimated rotational speed of the electric motor 2. Then, the control device 10 derives a current instruction in a current vector coordinate system based on the derived target torque, and derives a voltage instruction in the current vector coordinate system by performing, for example, proportional-integral control or proportional-integral-differential control based on a deviation between the derived current instruction and a feedback current. Here, the feedback current is a current in the current vector coordinate system derived by performing three-phase to two-phase conversion based on an estimated magnetic pole position of the electric motor 2 (an estimated magnetic pole position of the rotor) on detection values of currents flowing through the stator coils of the respective phases of the electric motor 2. The control device 10 derives a three-phase voltage instruction by performing two-phase to three-phase conversion on the derived voltage instruction, and generates, based on the derived three-phase voltage instruction, a control signal for performing switching control of the inverter by, for example, pulse width modulation (PWM) control.

Meanwhile, when the electric motor 2 is driven by sensorless control based on a rotational state of the electric motor 2 estimated using induced electromotive force in the above-described manner, in order to perform stable drive of the electric motor 2, the rotational speed of the electric motor 2 needs to be higher than or equal to a minimum rotational speed at which sensorless control can be performed. When in sensorless control, a rotational state of the electric motor 2 is estimated using induced electromotive force as in the present embodiment, the minimum rotational speed is a minimum rotational speed at which induced electromotive force of a magnitude that allows to accurately estimate a rotational state of the electric motor 2 is generated. Thus, for example, when the rotational speed of the electric motor 2 has decreased to a rotational speed less than the minimum rotational speed due to an increase in the load of the electric motor 2, a rotational state of the electric motor 2 cannot be accurately estimated, making it difficult to continue stable drive of the electric motor 2 by sensorless control. The increase in the load of the electric motor 2 can occur due to an increase in hydraulic pressure at the discharge port 41 of the motor-driven oil pump 40 which is associated with a change in the state of the hydraulic circuit 61 in the hydraulic control device 60.

In view of this, the control device 10 is configured to perform torque increase control when performing specific control that causes a change in the state of the hydraulic circuit 61 in the hydraulic control device 60 that involves an increase in hydraulic pressure at the discharge port 41, in a state in which a rotational speed N of the electric motor 2 is a first rotational speed N1. In the torque increase control, the drive of the electric motor 2 is controlled such that torque T of the electric motor 2 starts to increase before the hydraulic pressure at the discharge port 41 increases by the specific control. Namely, with the torque T of the electric motor 2 upon performing (immediately before performing) specific control (the torque T of the electric motor 2 in a state in which the rotational speed N of the electric motor 2 is the first rotational speed N1 as described above) being first torque T1, the control device 10 controls the drive of the electric motor 2 such that in torque increase control, the torque T of the electric motor 2 starts to increase from the first torque T1 before the hydraulic pressure at the discharge port 41 increases by the specific control. By performing such torque increase control when specific control is performed, even when the rotational speed N of the electric motor 2 decreases due to an increase in load associated with an increase in hydraulic pressure at the discharge port 41, the torque T of the electric motor 2 increases by performing the torque increase control, and accordingly, the amount of reduction in the rotational speed N can be kept to a minimum. As a result, it is configured such that even when the rotational speed N of the electric motor 2 decreases by specific control, it is difficult for the rotational speed N of the electric motor 2 to decrease to a rotational speed less than the above-described minimum rotational speed, enabling to continue stable drive of the electric motor 2 by sensorless control. Note that performance of specific control is determined by a device other than the control device 10, e.g., the above-described integrated control device, or is determined by the control device 10.

In the present embodiment, the control device 10 controls the drive of the electric motor 2 such that in torque increase control, the rotational speed N of the electric motor 2 starts to increase from the first rotational speed N1 before the hydraulic pressure at the discharge port 41 increases by specific control. Hence, in the present embodiment, the rotational speed N of the electric motor 2 increases in association with the increase in the torque T of the electric motor 2 which results from performing the torque increase control. By this, it can be configured such that even when the rotational speed N of the electric motor 2 decreases due to specific control, by increasing the rotational speed N which is before decreasing, it is difficult for the rotational speed N of the electric motor 2 to decrease to a rotational speed less than the above-described minimum rotational speed. As such, in the present embodiment, the torque increase control is control for increasing the torque T of the electric motor 2 so that the rotational speed N of the electric motor 2 can increase. Namely, in the present embodiment, it can be said that the torque increase control is rotational speed increase control.

Figure 2:
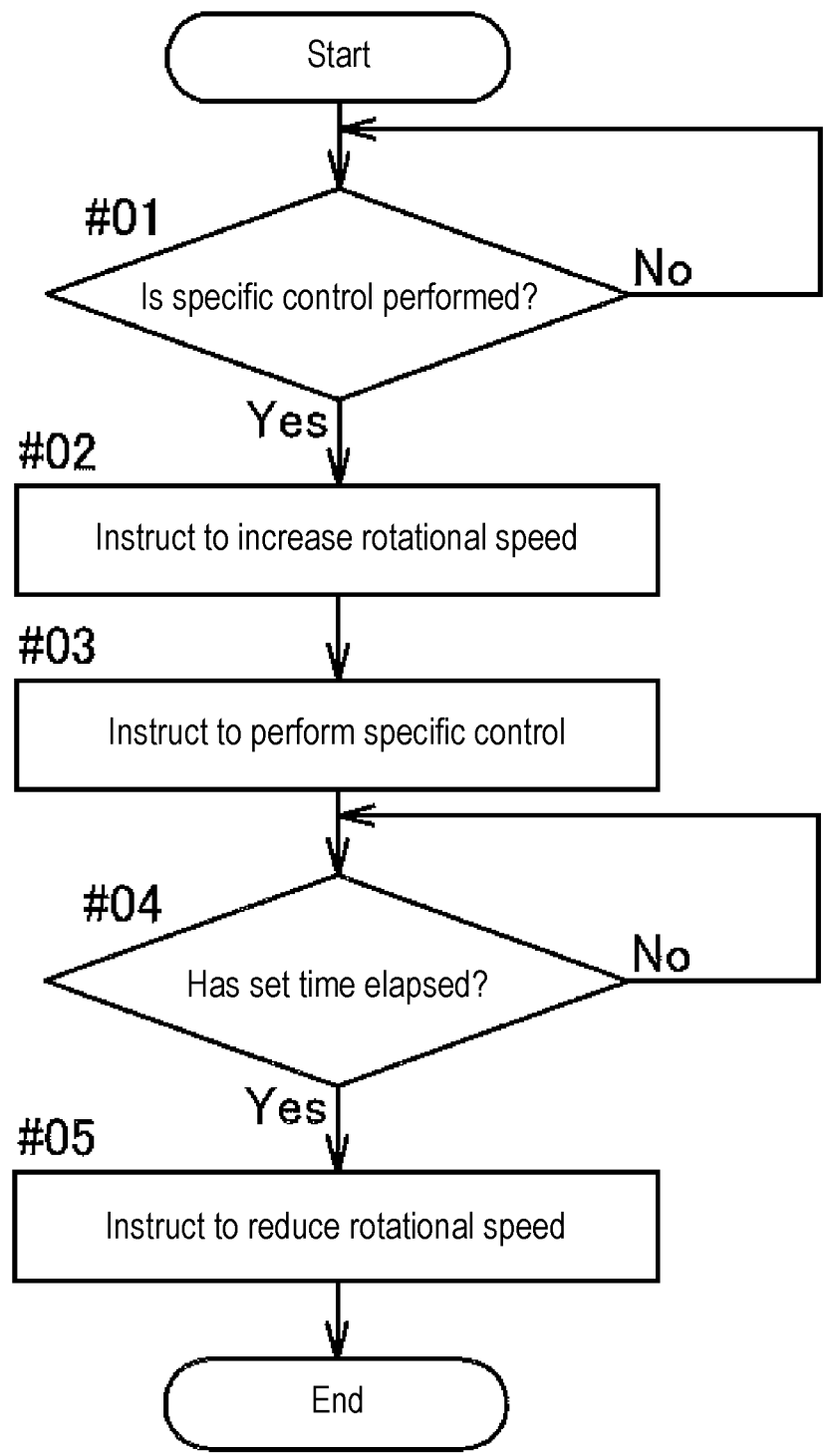
FIG. 2 is a diagram showing a processing procedure for torque increase control according to the embodiment.

Specifically, as shown in a processing procedure for torque increase control according to the present embodiment in FIG. 2, when the control device 10 performs specific control (step #01: Yes), the control device 10 performs torque increase control (step #02). In the present embodiment, at step #02, the control device 10 outputs an instruction to increase the rotational speed N of the electric motor 2, as an instruction to perform torque increase control. Then, in the present embodiment, after outputting the instruction to increase the rotational speed N of the electric motor 2 (step #02), the control device 10 outputs an instruction to perform specific control (step #03). Namely, the control device 10 instructs to start specific control (step #03) after instructing to start torque increase control (step #02). By this, the torque T of the electric motor 2 starts to increase from the first torque T1 before the hydraulic pressure at the discharge port 41 increases by the specific control. In the present embodiment, as a result of thus increasing the torque T of the electric motor 2, the rotational speed N of the electric motor 2 starts to increase from the first rotational speed N1 before the hydraulic pressure at the discharge port 41 increases by the specific control. The control device 10 controls the drive of the electric motor 2 such that in the torque increase control, the rotational speed N of the electric motor 2 after an increase in hydraulic pressure at the discharge port 41 is maintained higher than or equal to a minimum rotational speed at which sensorless control can be performed. Control for maintaining the rotational speed N of the electric motor 2 higher than or equal to the minimum rotational speed is continuously performed during a period from the start of the torque increase control until set time A has elapsed (step #04: No). Then, after a lapse of the set time A from the start of the torque increase control (step #04: Yes), the control device 10 reduces the rotational speed N of the electric motor 2 to the first rotational speed N1 (step #05), and the process ends.

Note that the instruction to increase the rotational speed N of the electric motor 2 which serves as an instruction to perform torque increase control (step #02) is outputted from a functional part (instruction generating part) of the control device 10 that generates an instruction, to a functional part (motor control part) of the control device 10 that controls the drive of the electric motor 2. For example, when the control device 10 (motor control part) is performing control (rotational speed control) for allowing the rotational speed N of the electric motor 2 to approach a target rotational speed by controlling the output torque of the electric motor 2, an instruction to increase the rotational speed N of the electric motor 2 which is generated by the control device 10 (instruction generating part) is an instruction to set a higher rotational speed than a current target rotational speed as the target rotational speed. In addition, when control (torque control) for allowing the torque (output torque) of the electric motor 2 to approach target torque is being performed, an instruction to perform torque increase control which is generated by the control device 10 (instruction generating part) is an instruction to set larger torque than current target torque as the target torque. Namely, in this case, at step #02 of FIG. 2, the control device 10 outputs an instruction to increase the torque T of the electric motor 2, as an instruction to perform torque increase control.

In addition, the instruction to perform specific control (step #03) is outputted from the control device 10 (instruction generating part) to a functional part (hydraulic control part) of the control device 10 that controls the hydraulic control device 60. The instruction to perform specific control is a current instruction provided to a solenoid valve 80 involving in the specific control, and the control device 10 (hydraulic control part) controls the current passage state of the solenoid valve 80 such that a current based on the current instruction flows.

The rotational speed N of the electric motor 2 is basically controlled to the first rotational speed N1, excluding during performance of torque increase control. In the present embodiment, the first rotational speed N1 is set to a rotational speed N determined based on the amount of oil required by the vehicle drive transmission device 20. For example, when the mechanical oil pump 4 is not driven due to the vehicle 3 being stopped, etc., the first rotational speed N1 is set to a rotational speed N at which the amount of oil required by the vehicle drive transmission device 20 can be supplied by the drive of the motor-driven oil pump 40. In addition, when both the mechanical oil pump 4 and the motor-driven oil pump 40 are driven, the first rotational speed N1 is set to a rotational speed N at which a portion of the amount of oil required by the vehicle drive transmission device 20 that is handled by the motor-driven oil pump 40 (the amount of oil obtained by subtracting the amount of oil discharged from the mechanical oil pump 4 from the amount of oil required by the vehicle drive transmission device 20) can be supplied by the drive of the motor-driven oil pump 40. Note that the amount of oil required by the vehicle drive transmission device 20 can be set to, for example, a value estimated by the control device 10, etc., based on the state of each part of the vehicle drive transmission device 20 and sensor detection information, or a value obtained by testing.

Next, specific operations of torque increase control according to the present embodiment will be described with reference to examples shown in FIGS. 4, 6, and 8 and comparative examples shown in FIGS. 5, 7, and 9. Note that in each time chart of FIGS. 4 to 9, a solid line indicates an instruction value and a dashed-double-dotted line schematically indicates an actual value. Note also that in each time chart of FIGS. 4 to 9, a graph for line pressure PL, a graph for the rotational speed N of the electric motor 2, a graph for the torque T of the electric motor 2, a graph for a control instruction signal SG for specific control, and a graph for hydraulic pressure PO at the discharge port 41 of the motor-driven oil pump 40 (hydraulic pressure on a discharge oil passage 79 side (on a first oil passage 71 side) of the discharge port 41) are shown in this order from the top. Note, however, that a graph for hydraulic pressure PO at the discharge port 41 of the motor-driven oil pump 40 is omitted in FIGS. 6 to 9. In addition, in FIGS. 4 to 9, a situation is assumed in which the rotational speed N (first rotational speed N1) of the electric motor 2 immediately before performing specific control is higher than the above-described minimum rotational speed.

Figure 4:
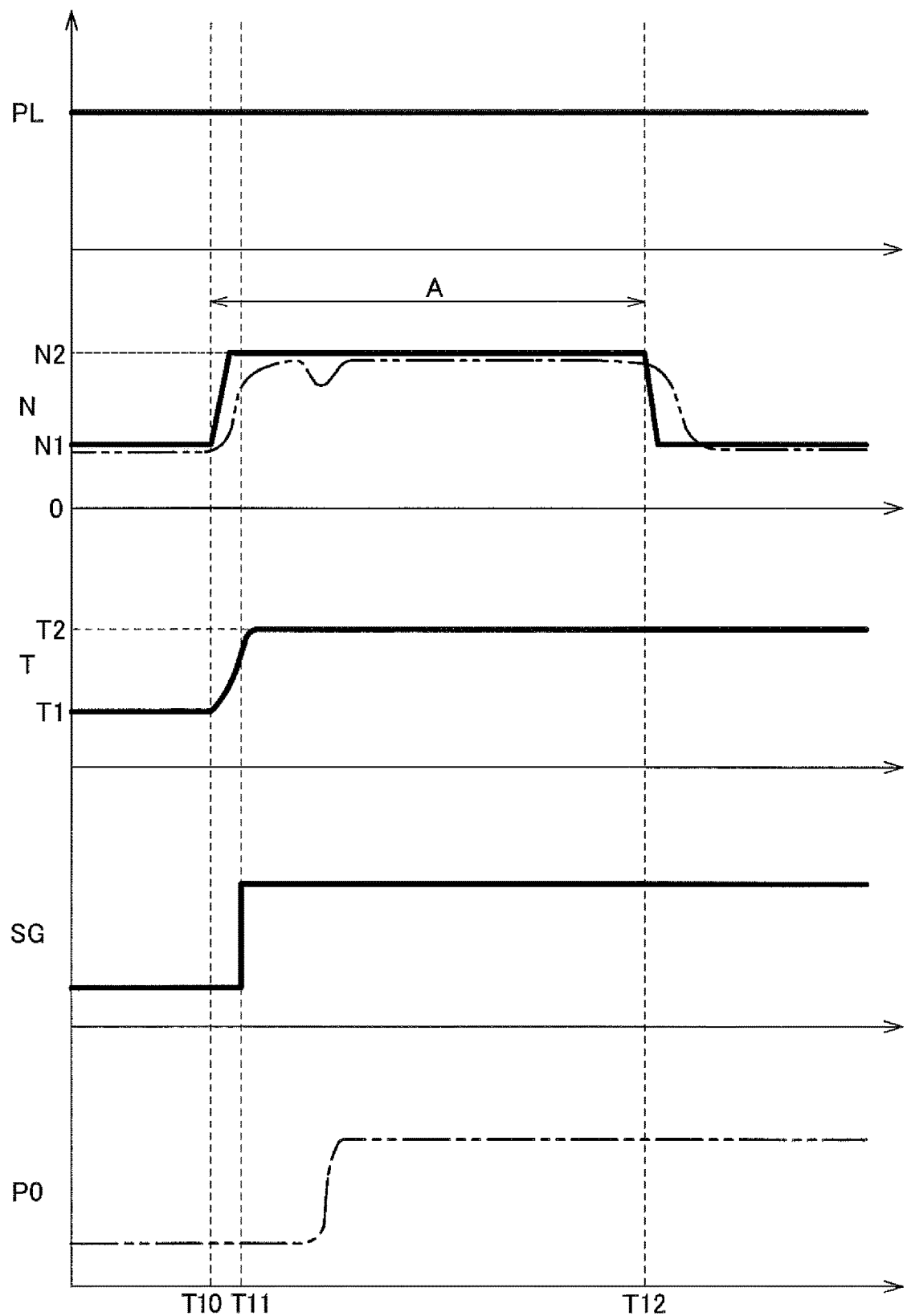
FIG. 4 is a time chart showing an example of control behavior according to the embodiment for a case in which specific control is control for switching a hydraulic circuit.

In the example shown in FIG. 4, a case is assumed in which as specific control, control for switching the hydraulic circuit 61 is performed in order to change a destination of oil to be supplied that is discharged from the discharge port 41 of the motor-driven oil pump 40. Specifically, a case is assumed in which in a state in which the state of the switching valve 63 is such that the sixth oil passage 76 communicates with the lubricating oil chamber 65, and both the mechanical oil pump 4 and the motor-driven oil pump 40 are driven, as specific control, control for switching the state of the switching valve 63 to a state in which the fifth oil passage 75 communicates with the lubricating oil chamber 65 is performed. Namely, a case is assumed in which by performing specific control, a destination of oil to be supplied that is discharged from the motor-driven oil pump 40 is switched from the sixth oil passage 76 that communicates with the lubricating oil chamber 65 without through the third oil passage 73 in which hydraulic pressure is regulated to line pressure PL, to the third oil passage 73 whose hydraulic pressure in the oil passage is higher than in the sixth oil passage 76.

Figure 5:
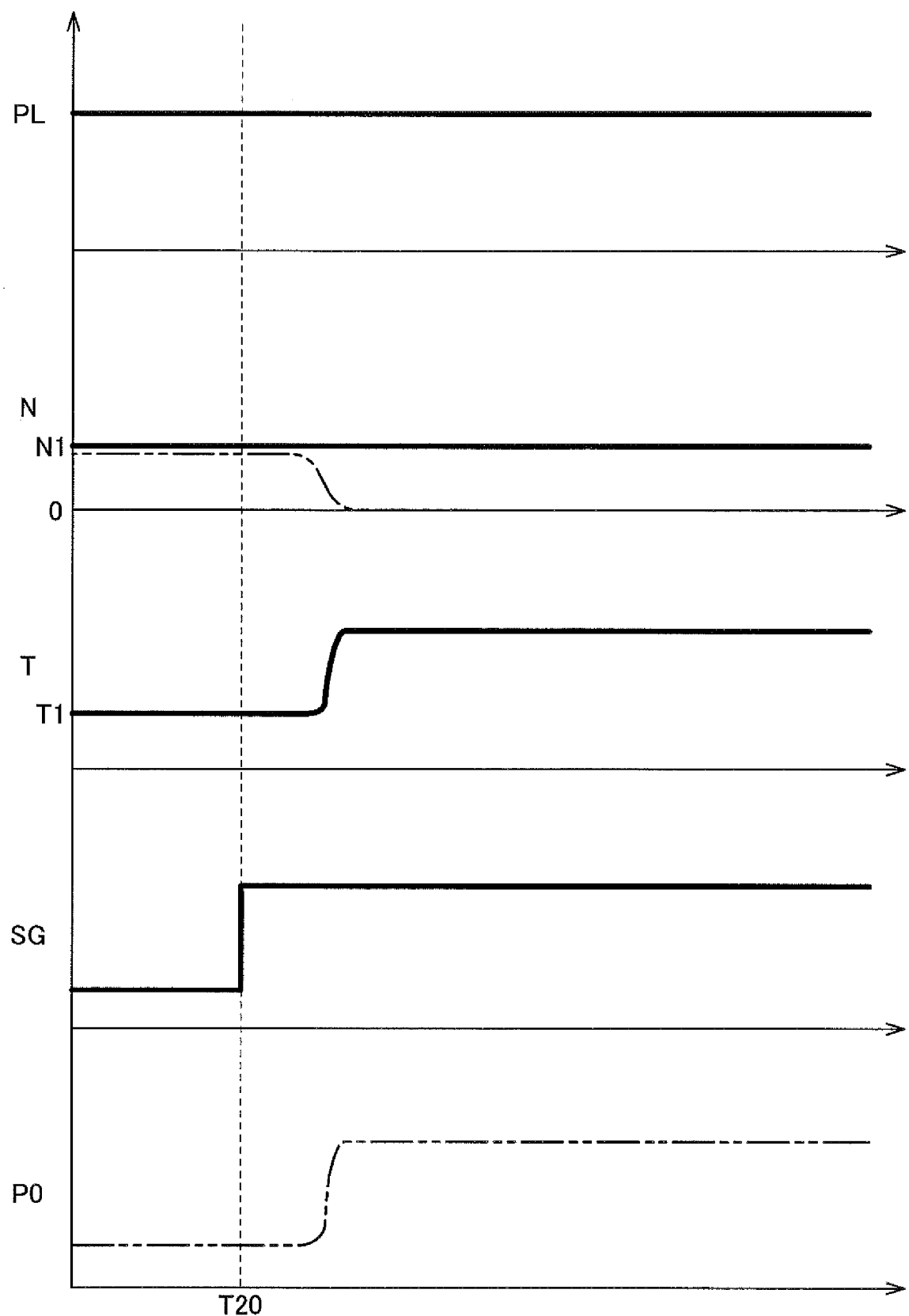
FIG. 5 is a time chart showing an example of control behavior according to a comparative example for a case in which the specific control is control for switching the hydraulic circuit.

FIG. 5 is a comparative example of a case in which such specific control is performed without performing the above-described torque increase control. In FIG. 5, performance of specific control is instructed (a control instruction signal SG for starting specific control is generated) at time T20. Here, the instruction to perform specific control (control instruction signal SG) is a current instruction provided to the fifth solenoid valve 85 that controls the state of the switching valve 63, and is an instruction to switch the state of the switching valve 63 from the state in which the sixth oil passage 76 communicates with the lubricating oil chamber 65 to a state in which the fifth oil passage 75 communicates with the lubricating oil chamber 65. When such specific control is performed, the destination of oil to be supplied that is discharged from the motor-driven oil pump 40 is switched from the sixth oil passage 76 to the third oil passage 73 whose hydraulic pressure in the oil passage is higher than in the sixth oil passage 76. Hence, as shown in FIG. 5, at a point in time when the state of the switching valve 63 is actually switched (a point in time later than time T20), the hydraulic pressure PO at the discharge port 41 also increases in response to an increase in the hydraulic pressure of the destination of oil to be supplied, and accordingly, the rotational speed N of the electric motor 2 decreases from the first rotational speed N1. FIG. 5 shows a situation in which due to the rotational speed N of the electric motor 2 decreasing to zero (i.e., a rotational speed less than the above-described minimum rotational speed), it has become difficult to continue drive of the electric motor 2 by sensorless control.

On the other hand, in the present embodiment, the above-described torque increase control is performed, and in the example shown in FIG. 4, at time T10 earlier than time T11 at which performance of specific control is instructed, performance of torque increase control (here, an increase in the rotational speed N of the electric motor 2) is instructed. Here, a situation in which the electric motor 2 is controlled by rotational speed control is assumed, and at time T10 a target rotational speed (a solid line in FIG. 4) changes from the first rotational speed N1 to a second rotational speed N2 higher than the first rotational speed N1. By instructing to increase the rotational speed N of the electric motor 2 before the instruction to perform specific control, the actual rotational speed N of the electric motor 2 (a dashed-double-dotted line in FIG. 4) starts to increase from the first rotational speed N1 before the hydraulic pressure PO at the discharge port 41 starts to increase by specific control. Namely, by the torque T of the electric motor 2 starting to increase from the first torque T1 before the hydraulic pressure PO at the discharge port 41 starts to increase by specific control, the rotational speed N of the electric motor 2 starts to increase from the first rotational speed N1. The same also applies to the examples shown in FIGS. 6 and 8 which will be described later. By thus allowing the rotational speed N of the electric motor 2 to start to increase before the hydraulic pressure PO at the discharge port 41 starts to increase, as shown in FIG. 4, the rotational speed N which is before decreasing and obtained when the rotational speed N of the electric motor 2 decreases in response to the increase in the hydraulic pressure PO at the discharge port 41 can be increased, enabling to avoid the rotational speed N of the electric motor 2 from decreasing to a rotational speed less than the minimum rotational speed. Note that when the electric motor 2 is controlled by torque control, the target torque of the electric motor 2 is changed from the first torque T1 to second torque T2 larger than the first torque T1, by which the torque T of the electric motor 2 starts to increase from the first torque T1. The same also applies to the examples shown in FIGS. 6 and 8 which will be described later.

As a result of the rotational speed N of the electric motor 2 not decreasing to a rotational speed less than the minimum rotational speed, drive of the electric motor 2 by sensorless control can continue, and the rotational speed N of the electric motor 2 thereafter increases to the second rotational speed N2. Then, when the set time A has elapsed from the start of the torque increase control (time T10), the target rotational speed of the electric motor 2 changes from the second rotational speed N2 to the first rotational speed N1, and the rotational speed N of the electric motor 2 decreases to the first rotational speed N1.

Figure 6:
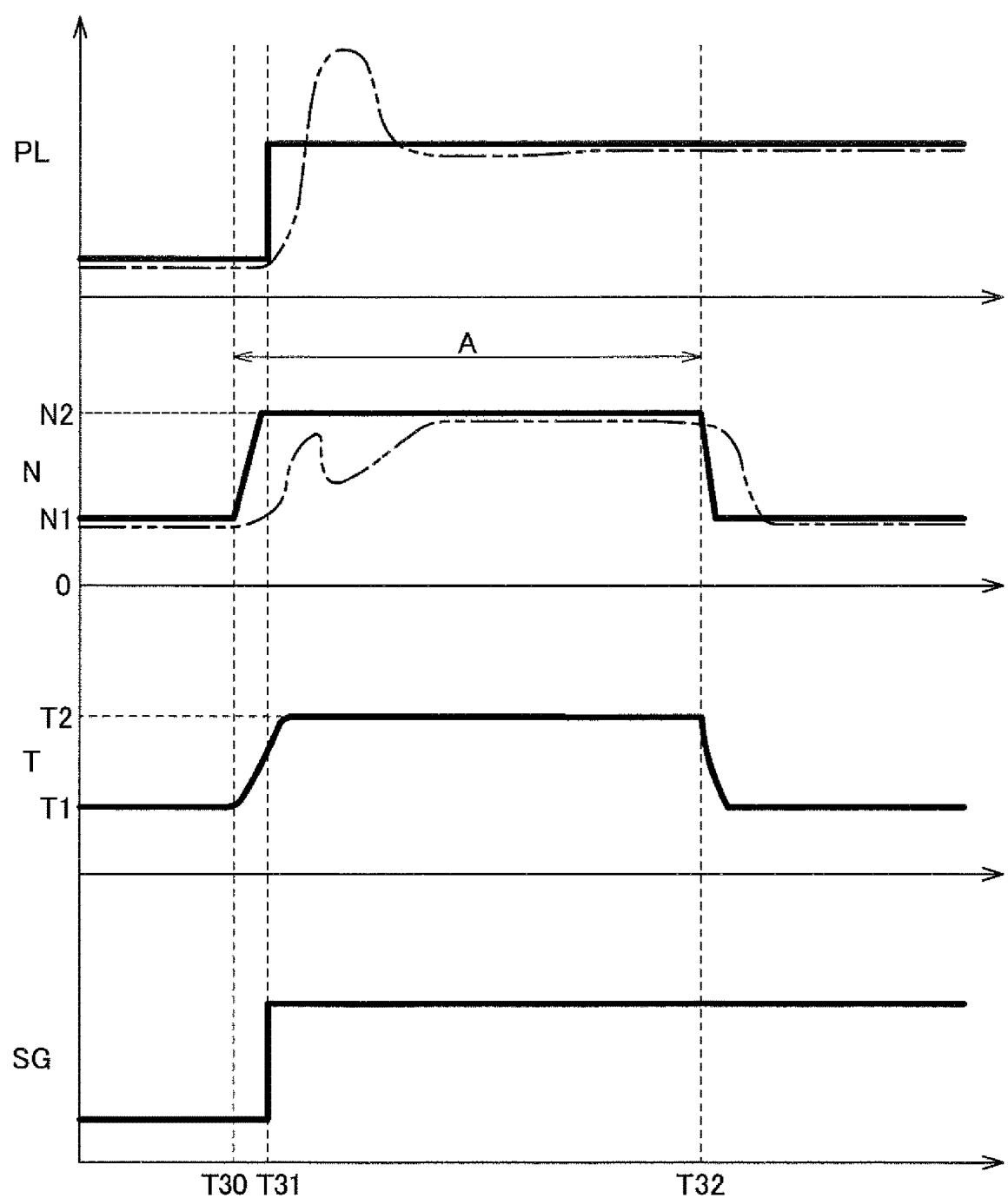
FIG. 6 is a time chart showing an example of control behavior according to the embodiment for a case in which the specific control is control for changing a hydraulic pressure instruction provided to a hydraulic regulating valve.

In the example shown in FIG. 6, a case is assumed in which as specific control, control for changing a hydraulic pressure instruction provided to the hydraulic regulating valve 62 is performed in order to increase line pressure PL. Specifically, a situation is assumed in which in a situation in which drive of the mechanical oil pump 4 is stopped and only oil discharged from the motor-driven oil pump 40 is supplied to the third oil passage 73, as specific control, the target value of line pressure PL is changed to a high side.

Figure 7:
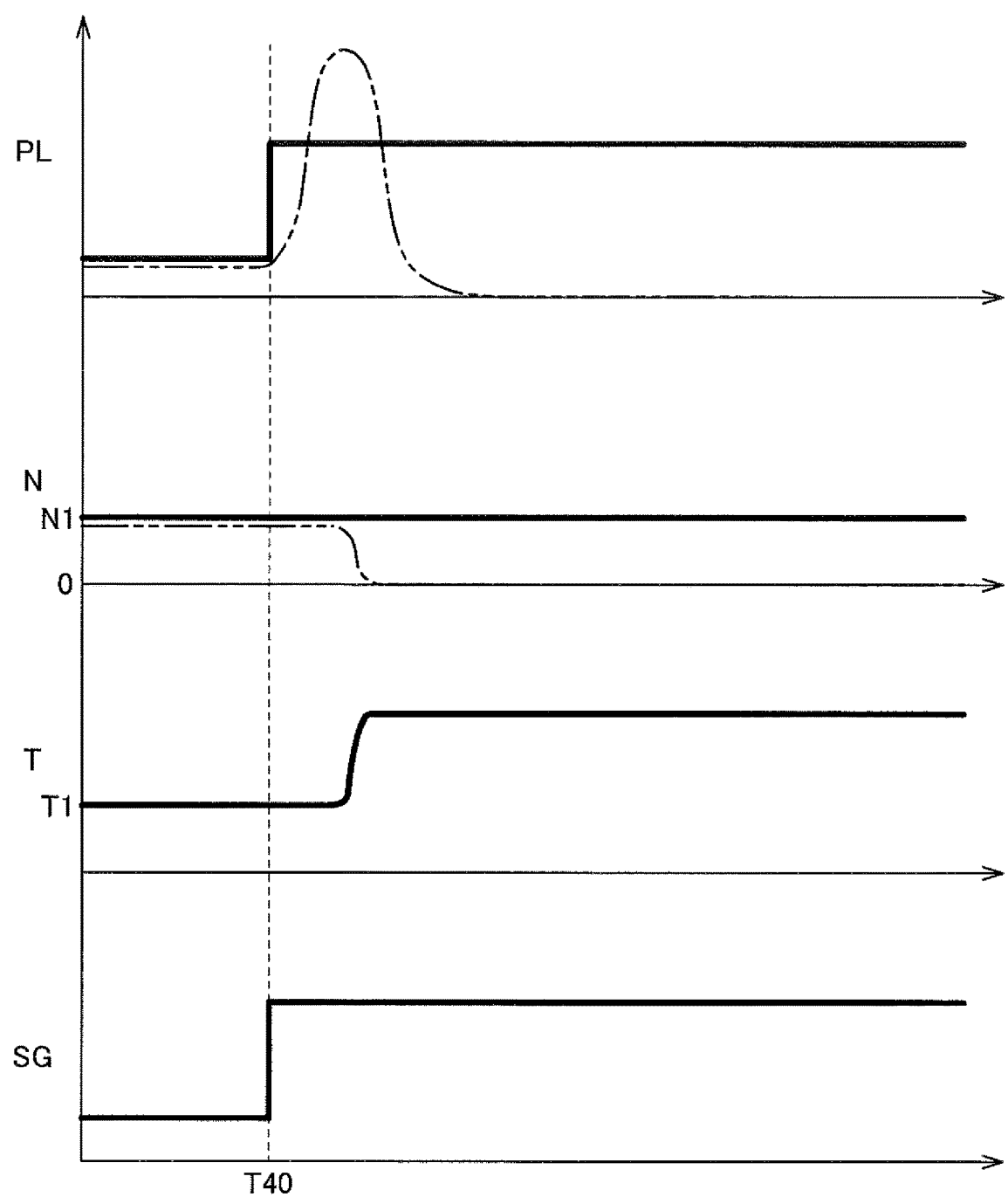
FIG. 7 is a time chart showing an example of control behavior according to a comparative example for a case in which the specific control is control for changing a hydraulic pressure instruction provided to the hydraulic regulating valve.

FIG. 7 is a comparative example of a case in which such specific control is performed without performing the above-described torque increase control. In FIG. 7, performance of specific control is instructed (a control instruction signal SG is generated) at time T40. Here, the instruction to perform specific control (control instruction signal SG) is a current instruction provided to the fourth solenoid valve 84 that controls the state of the hydraulic regulating valve 62, and is an instruction to set higher hydraulic pressure than current target line pressure as target line pressure. As shown in FIG. 7, when such specific control is performed, in the process of regulation performed by the hydraulic regulating valve 62 to allow the line pressure PL to match the new target line pressure, the actual line pressure PL may temporarily significantly exceed the target line pressure. Such a phenomenon tends to occur when the oil temperature is low. In FIG. 7, due to the actual line pressure PL significantly exceeding the target line pressure at a point in time later than time T40, the hydraulic pressure at the discharge port 41 also increases, and accordingly, the rotational speed N of the electric motor 2 decreases from the first rotational speed N1. FIG. 7 shows a situation in which due to the rotational speed N of the electric motor 2 decreasing to zero (i.e., a rotational speed less than the above-described minimum rotational speed), it has become difficult to continue drive of the electric motor 2 by sensorless control.

On the other hand, in the present embodiment, the above-described torque increase control is performed, and in the example shown in FIG. 6, at time T30 earlier than time T31 at which performance of specific control is instructed, performance of torque increase control (here, an increase in the rotational speed N of the electric motor 2) is instructed. Here, a situation in which the electric motor 2 is controlled by rotational speed control is assumed, and at time T30 a target rotational speed (a solid line in FIG. 6) changes from the first rotational speed N1 to a second rotational speed N2 higher than the first rotational speed N1. By instructing to increase the rotational speed N of the electric motor 2 before the instruction to perform specific control, the actual rotational speed N of the electric motor 2 (a dashed-double-dotted line in FIG. 6) starts to increase from the first rotational speed N1 before the hydraulic pressure at the discharge port 41 starts to increase by specific control (here, the actual line pressure PL starts to increase). By thus allowing the rotational speed N of the electric motor 2 to start to increase before the hydraulic pressure at the discharge port 41 starts to increase, as shown in FIG. 6, the rotational speed N which is before decreasing and obtained when the rotational speed N of the electric motor 2 decreases in response to the increase in hydraulic pressure at the discharge port 41 can be increased, enabling to avoid the rotational speed N of the electric motor 2 from decreasing to a rotational speed less than the minimum rotational speed.

As a result of the rotational speed N of the electric motor 2 not decreasing to a rotational speed less than the minimum rotational speed, drive of the electric motor 2 by sensorless control can continue, and the rotational speed N of the electric motor 2 thereafter increases to the second rotational speed N2. Then, when the set time A has elapsed from the start of the torque increase control (time T30), the target rotational speed of the electric motor 2 changes from the second rotational speed N2 to the first rotational speed N1, and the rotational speed N of the electric motor 2 decreases to the first rotational speed N1.

Figure 8:
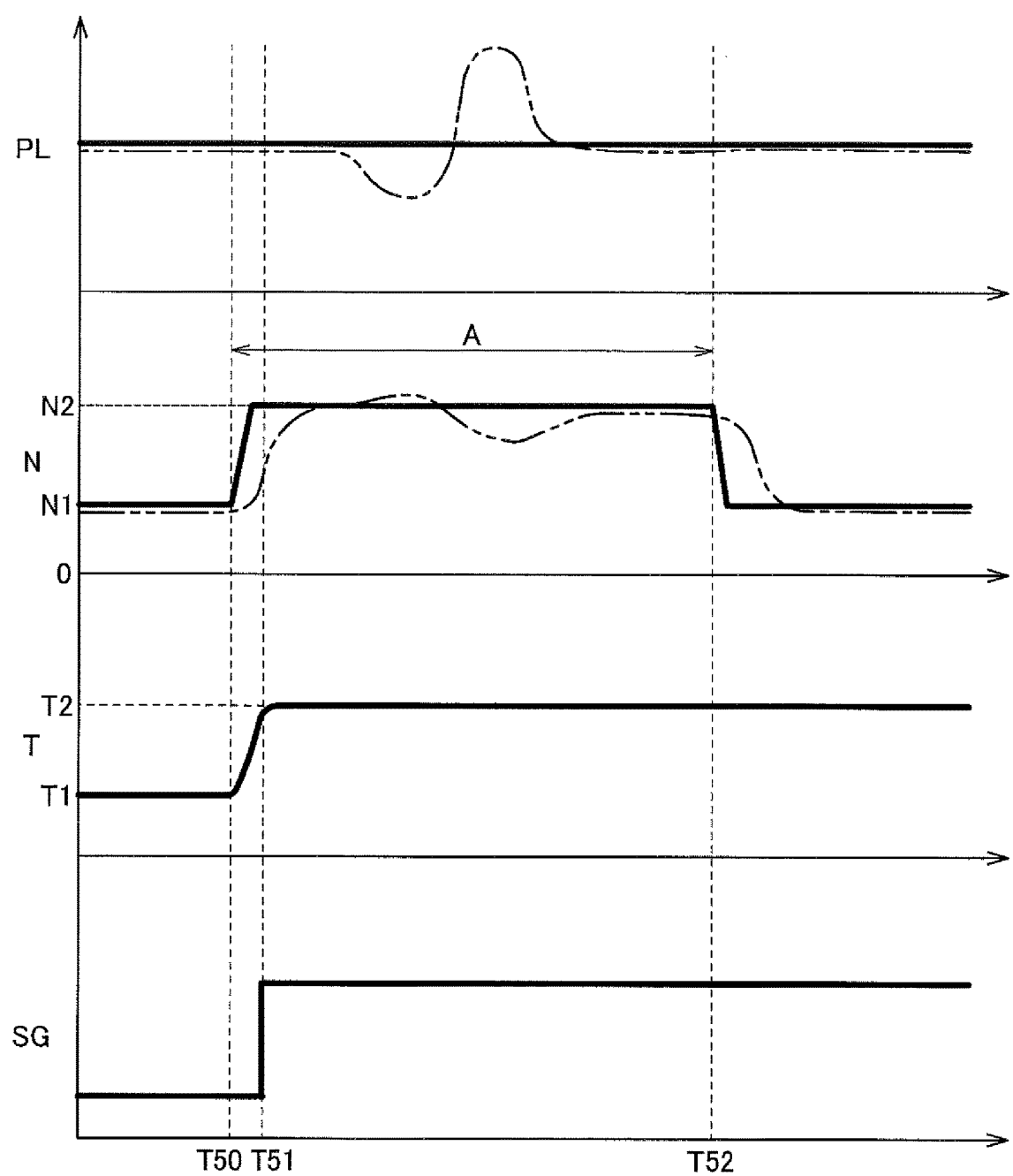
FIG. 8 is a time chart showing an example of control behavior according to the embodiment for a case in which the specific control is control for changing the state of a solenoid valve.

In the example shown in FIG. 8, a case is assumed in which as specific control, control for changing the state of a solenoid valve 80 is performed. Specifically, a situation is assumed in which in a situation in which drive of the mechanical oil pump 4 is stopped and only oil discharged from the motor-driven oil pump 40 is supplied to the third oil passage 73, as specific control, the state of a solenoid valve 80 (here, the first solenoid valve 81 or the second solenoid valve 82) that regulates hydraulic pressure supplied to a hydraulic servomechanism 64 is changed from a state in which hydraulic pressure is not supplied to the hydraulic servomechanism 64 to a state in which hydraulic pressure (e.g., line pressure PL) is supplied to the hydraulic servomechanism 64.

Figure 9:
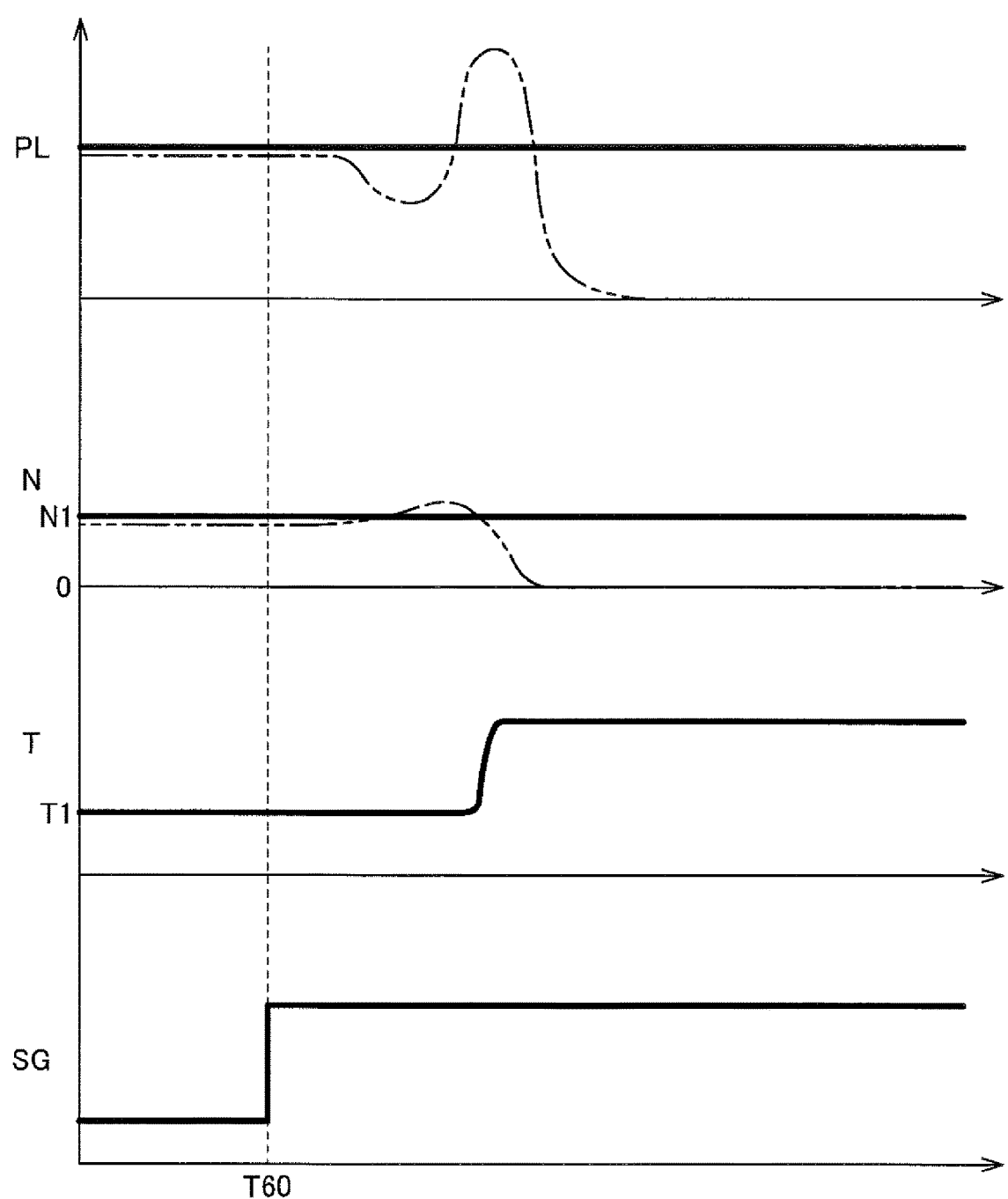
FIG. 9 is a time chart showing an example of control behavior according to a comparative example for a case in which the specific control is control for changing the state of the solenoid valve.

FIG. 9 is a comparative example of a case in which such specific control is performed without performing the above-described torque increase control. In FIG. 9, performance of specific control is instructed (a control instruction signal SG is generated) at time T60. Here, the instruction to perform specific control (control instruction signal SG) is a current instruction provided to a solenoid valve 80 (the first solenoid valve 81 or the second solenoid valve 82) that regulates hydraulic pressure supplied to a hydraulic servomechanism 64, and is an instruction to set the target value of hydraulic pressure supplied to the hydraulic servomechanism 64 to a value (e.g., line pressure PL) higher than a current target value (zero). As shown in FIG. 9, when such specific control is performed, the line pressure PL decreases due to the supply of oil in the third oil passage 73 to the hydraulic servomechanism 64, but in the process of regulation performed at this time by the hydraulic regulating valve 62 to allow the line pressure PL to match the target line pressure, the actual line pressure PL may temporarily significantly exceed the target line pressure. Such a phenomenon tends to occur when the oil temperature is low. In FIG. 9, due to the actual line pressure PL significantly exceeding the target line pressure at a point in time later than time T60, the hydraulic pressure at the discharge port 41 also increases, and accordingly, the rotational speed N of the electric motor 2 decreases from the first rotational speed N1. FIG. 9 shows a situation in which due to the rotational speed N of the electric motor 2 decreasing to zero (i.e., a rotational speed less than the above-described minimum rotational speed), it has become difficult to continue drive of the electric motor 2 by sensorless control.

On the other hand, in the present embodiment, the above-described torque increase control is performed, and in the example shown in FIG. 8, at time T50 earlier than time T51 at which performance of specific control is instructed, performance of torque increase control (here, an increase in the rotational speed N of the electric motor 2) is instructed. Here, a situation in which the electric motor 2 is controlled by rotational speed control is assumed, and at time T50 a target rotational speed (a solid line in FIG. 8) changes from the first rotational speed N1 to a second rotational speed N2 higher than the first rotational speed N1. By instructing to increase the rotational speed N of the electric motor 2 before the instruction to perform specific control, the actual rotational speed N of the electric motor 2 (a dashed-double-dotted line in FIG. 8) starts to increase from the first rotational speed N1 before the hydraulic pressure at the discharge port 41 starts to increase by specific control (here, the actual line pressure PL starts to increase after a decrease). By thus allowing the rotational speed N of the electric motor 2 to start to increase before the hydraulic pressure at the discharge port 41 starts to increase, as shown in FIG. 8, the rotational speed N which is before decreasing and obtained when the rotational speed N of the electric motor 2 decreases in response to the increase in hydraulic pressure at the discharge port 41 can be increased, enabling to avoid the rotational speed N of the electric motor 2 from decreasing to a rotational speed less than the minimum rotational speed.

As a result of the rotational speed N of the electric motor 2 not decreasing to a rotational speed less than the minimum rotational speed, drive of the electric motor 2 by sensorless control can continue, and the rotational speed N of the electric motor 2 thereafter increases to the second rotational speed N2. Then, when the set time A has elapsed from the start of the torque increase control (time T50), the target rotational speed of the electric motor 2 changes from the second rotational speed N2 to the first rotational speed N1, and the rotational speed N of the electric motor 2 decreases to the first rotational speed N1.

As such, in the present embodiment, the target value of the rotational speed N of the electric motor 2 during performance of torque increase control is set to the second rotational speed N2. The second rotational speed N2 may be a fixed value that does not change according to the first rotational speed N1, or may be a variable value that changes according to the first rotational speed N1. In the former case, for example, it can be configured such that only when the first rotational speed N1 obtained when performing (obtained immediately before performing) specific control is less than the second rotational speed, torque increase control is performed together with specific control. In addition, in the latter case, for example, a rotational speed obtained by adding a set value to the first rotational speed N1 can be set as the second rotational speed N2.

Other Embodiments

Next, other embodiments of the control device will be described.

(1) The above-described embodiment describes, as an example, a configuration in which when the control device 10 performs specific control and torque increase control, an instruction to perform specific control is outputted after outputting an instruction to increase the rotational speed N of the electric motor 2 as an instruction to perform torque increase control (i.e., an instruction to start specific control is provided after providing an instruction to start torque increase control), by which an increase in the torque T of the electric motor 2 (an increase from the first torque T1) starts before the hydraulic pressure at the discharge port 41 increases by the specific control. However, the configuration is not limited thereto, and as long as an increase in the torque T of the electric motor 2 can start before the hydraulic pressure at the discharge port 41 increases by specific control, an instruction to perform torque increase control (in the above-described embodiment, an instruction to increase the rotational speed N of the electric motor 2) may be outputted at the same time as an instruction to perform specific control. Namely, the configuration may be such that the control device 10 provides an instruction to start torque increase control and an instruction to start specific control at the same time or at the same timing.

(2) The above-described embodiment describes, as an example, a configuration in which the control device 10 reduces the rotational speed N of the electric motor 2 to the first rotational speed N1 after a lapse of the set time A from the start of torque increase control. Namely, as an example, a configuration (a configuration in which a predetermined period of time is the set time A) is described in which in a configuration in which the control device 10 reduces the rotational speed of the electric motor 2 to the first rotational speed N1 after a lapse of the predetermined period of time from the start of torque increase control, the timing at which the rotational speed N of the electric motor 2 decreases is timing at which the set time A has elapsed from the start of the torque increase control. However, the configuration is not limited thereto, and the configuration can also be such that a point in time when the rotational speed N of the electric motor 2 decreases is determined based on an index other than the time elapsed from the start of torque increase control (e.g., the time elapsed from the start of specific control or a detection value of line pressure PL). Namely, it is preferred that the predetermined period of time be sufficient time for the increase in hydraulic pressure at the discharge port 41 to end, and the predetermined period of time may be determined in advance as the time elapsed from the start of torque increase control (the set time A in the above-described embodiment) or as the time elapsed from the start of specific control (set time), or may be time determined from a detection value of line pressure PL, etc., every time the detection value is obtained (i.e., every time torque increase control is performed). In addition, the configuration can also be such that after a lapse of the predetermined period of time from the start of torque increase control, the rotational speed N of the electric motor 2 is reduced to a rotational speed N different than the first rotational speed N1 (i.e., a rotational speed N different than that obtained before performing the torque increase control).

(3) The above-described embodiment describes, as an example, a configuration in which the control device 10 controls the drive of the electric motor 2 such that in torque increase control, the rotational speed N of the electric motor 2 starts to increase from the first rotational speed N1 before the hydraulic pressure at the discharge port 41 increases by specific control. However, the configuration is not limited thereto, and for example, the configuration can also be such that the control device 10 controls the drive of the electric motor 2 such that in torque increase control, the rotational speed N of the electric motor 2 is maintained at the first rotational speed N1.

(4) The above-described embodiment describes, as an example, a configuration in which the electric motor 2 is a synchronous motor (synchronous rotating electrical machine), and the control device 10 estimates a rotational state (magnetic pole position or rotational speed) of the electric motor 2 without using a position sensor. However, the configuration is not limited thereto, and the configuration can also be such that the electric motor 2 is an induction motor (induction rotating electrical machine), and the control device 10 estimates a rotational state of the electric motor 2 without using a rotation sensor (speed sensor).

(5) The hydraulic circuit 61 shown in the above-described embodiment is merely an example, and the configuration of the hydraulic circuit 61 can be changed as appropriate, according to the configuration of the vehicle drive transmission device 20, etc. For example, although the above-described embodiment shows, as an example, a configuration in which a second hydraulic regulating valve that regulates the hydraulic pressure of extra oil from the hydraulic regulating valve 62 is not provided in the hydraulic circuit 61, the configuration can also be such that such a second hydraulic regulating valve is provided in the hydraulic circuit 61.

(6) The vehicle drive transmission device 20 shown in the above-described embodiment is merely an example, and the configuration of the vehicle drive transmission device 20 can be changed as appropriate.

(7) Note that the configurations disclosed in each of the above-described embodiments can also be applied by combining them with the configurations disclosed in the other embodiments (including a combination of embodiments described as the other embodiments) as long as a contradiction does not arise. For other configurations, too, the embodiment disclosed in this specification is to be considered in all respects as merely illustrative. Therefore, various modifications can be made as appropriate without departing from the true spirit and scope of the present disclosure.

Summary of the Above-Described Embodiment

A summary of a control device described above will be described below.

In a control device (10) whose control target is an oil supply device (1) including a motor-driven oil pump (40) driven by an electric motor (2); and a hydraulic control device (60) that controls hydraulic pressure of oil discharged from a discharge port (41) of the motor-driven oil pump (40), and supplies the oil to a vehicle drive transmission device (20), the control device (10) driving the electric motor (2) by sensorless control performed based on an estimated rotational position or an estimated rotational speed, when specific control that causes a change in a state of a hydraulic circuit (61) in the hydraulic control device (60) that involves an increase in hydraulic pressure at the discharge port (41) is performed in a state in which a rotational speed (N) of the electric motor (2) is a first rotational speed (N1), torque increase control that controls drive of the electric motor (2) is performed such that torque (T) of the electric motor (2) starts to increase before hydraulic pressure at the discharge port (41) increases by the specific control.

According to the above-described configuration, by performing torque increase control when specific control is performed, an increase in the torque (T) of the electric motor (2) can start before the hydraulic pressure at the discharge port (41) of the motor-driven oil pump (40) increases by the specific control. Thus, even when the rotational speed (N) of the electric motor (2) decreases due to an increase in load associated with an increase in hydraulic pressure at the discharge port (41), the torque (T) of the electric motor (2) increases by performing torque increase control, and accordingly, the amount of reduction in the rotational speed (N) can be kept to a minimum. As a result, it can be configured such that even when the rotational speed (N) of the electric motor (2) decreases by specific control, it is difficult for the rotational speed (N) of the electric motor (2) to decrease to a rotational speed range in which stable drive of the electric motor (2) by sensorless control becomes difficult.

As such, according to the above-described configuration, even in a situation in which the hydraulic pressure at the discharge port (41) of the motor-driven oil pump (40) increases with a change in the state of the hydraulic circuit (61) in the hydraulic control device (60), it becomes possible to continue stable drive of the electric motor (2) by sensorless control.

Here, it is preferred that the first rotational speed (N1) be a rotational speed (N) determined based on an amount of oil required by the vehicle drive transmission device (20).

According to this configuration, in normal times when specific control is not performed, the rotational speed (N) of the electric motor (2) can be set to a rotational speed (N) determined based on the amount of oil required by the vehicle drive transmission device (20), i.e., a rotational speed (N) determined based on the amount of oil that needs to be discharged from the motor-driven oil pump (40), and thus, a reduction in efficiency due to the motor-driven oil pump (40) discharging oil more than necessary can be suppressed.

In addition, it is preferred that in the torque increase control, drive of the electric motor (2) be controlled such that a rotational speed (N) of the electric motor (2) after an increase in hydraulic pressure at the discharge port (41) is maintained higher than or equal to a minimum rotational speed at which the sensorless control can be performed.

According to this configuration, even when the rotational speed (N) of the electric motor (2) decreases due to an increase in load associated with an increase in hydraulic pressure at the discharge port (41), it becomes easier to avoid the rotational speed (N) of the electric motor (2) from decreasing to a rotational speed range in which stable drive of the electric motor (2) by sensorless control becomes difficult.

In addition, it is preferred that in the torque increase control, drive of the electric motor (2) be controlled such that a rotational speed (N) of the electric motor (2) starts to increase from the first rotational speed (N1) before hydraulic pressure at the discharge port (41) increases by the specific control.

According to this configuration, even when the rotational speed (N) of the electric motor (2) decreases due to an increase in load associated with an increase in hydraulic pressure at the discharge port (41), the rotational speed (N) of the electric motor (2) increases by performing torque increase control, and accordingly, the rotational speed (N) which is before decreasing can be increased. Thus, it can be configured such that even when the rotational speed (N) of the electric motor (2) decreases by specific control, it is difficult for the rotational speed (N) of the electric motor (2) to decrease to a rotational speed range in which stable drive of the electric motor (2) by sensorless control becomes difficult.

It is preferred that in a configuration in which, as described above, in the torque increase control, drive of the electric motor (2) is controlled such that a rotational speed (N) of the electric motor (2) starts to increase from the first rotational speed (N1) before hydraulic pressure at the discharge port (41) increases by the specific control, a rotational speed (N) of the electric motor (2) be reduced to the first rotational speed (N1) after a lapse of a predetermined period of time from a start of the torque increase control.

According to this configuration, a period during which the electric motor (2) is driven at a higher rotational speed (N) than a rotational speed determined based on the amount of oil that needs to be discharged from the motor-driven oil pump (40) is a temporary period, and thus, it becomes possible to keep the amount of reduction in efficiency due to performance of torque increase control to a minimum.

It is preferred that in the control device (10) of each of the above-described configurations, an instruction to start the specific control be provided after providing an instruction to start the torque increase control.

According to this configuration, the torque (T) of the electric motor (2) can appropriately start to increase before the hydraulic pressure at the discharge port (41) of the motor-driven oil pump (40) increases by specific control.

In addition, it is preferred that the specific control be control for switching the hydraulic circuit (61) in order to change a destination of oil to be supplied, the oil being discharged from the discharge port (41).

When the specific control is such control, by performing the specific control, hydraulic pressure in an oil passage for a destination of oil to be supplied (hereinafter, referred to as "supply destination's hydraulic pressure".) can change. When the supply destination's hydraulic pressure increases by performing the specific control, the hydraulic pressure at the discharge port (41) also increases accordingly, and the rotational speed (N) of the electric motor (2) can decrease, but even in such a case, by performing the above-described torque increase control, it becomes possible to continue stable drive of the electric motor (2) by sensorless control.

In addition, it is preferred that the hydraulic control device (60) include a discharge oil passage (79) connected to the discharge port (41); and a hydraulic regulating valve (62) provided in the discharge oil passage (79) and regulating hydraulic pressure on an upstream side to set hydraulic pressure (PL) by emitting part of oil discharged from the discharge port (41) to a downstream side, and the specific control be control for changing a hydraulic pressure instruction provided to the hydraulic regulating valve (62) in order to increase the set hydraulic pressure (PL).

When the specific control is such control, by performing the specific control, the hydraulic pressure at the discharge port (41) increases in response to an increase in the set hydraulic pressure (PL) and the rotational speed (N) of the electric motor (2) can decrease, but even in such a case, by performing the above-described torque increase control, it becomes possible to continue stable drive of the electric motor (2) by sensorless control.

In addition, it is preferred that the hydraulic control device (60) include a solenoid valve (80) provided in an oil passage (70) in the hydraulic circuit (61) and regulating whether to supply hydraulic pressure to a downstream side, or hydraulic pressure supplied to a downstream side, and the specific control be control for changing a state of the solenoid valve (80).

When the specific control is such control, by performing of the specific control, the state of the hydraulic circuit (61) changes in response to a change in the state of the solenoid valve (80). When a change in the state of the hydraulic circuit (61) in the hydraulic control device (60) that involves an increase in hydraulic pressure at the discharge port (41) occurs by performing the specific control, the rotational speed (N) of the electric motor (2) can decrease, but even in such a case, by performing the above-described torque increase control, it becomes possible to continue stable drive of the electric motor (2) by sensorless control.

A control device according to the present disclosure can provide at least one of the above-described advantageous effects.

The invention claimed is:

1. A control device whose control target is an oil supply device including a motor-driven oil pump driven by an electric motor; and a hydraulic control device that controls hydraulic pressure of oil discharged from a discharge port of the motor-driven oil pump, and supplies the oil to a vehicle drive transmission device, the control device driving the electric motor by sensorless control performed based on an estimated rotational position or an estimated rotational speed, the control device comprising:
    an electronic control unit that is configured to perform,
    when specific control that causes a change in a state of a hydraulic circuit in the hydraulic control device that involves an increase in hydraulic pressure at the discharge port is performed in a state in which a rotational speed of the electric motor is a first rotational speed, torque increase control that controls drive of the electric motor such that torque of the electric motor starts to increase before hydraulic pressure at the discharge port increases by the specific control.

2. The control device according to claim 1, wherein the first rotational speed is a rotational speed determined based on an amount of oil required by the vehicle drive transmission device.

3. The control device according to claim 1, wherein in the torque increase control, drive of the electric motor is controlled such that a rotational speed of the electric motor after an increase in hydraulic pressure at the discharge port is maintained higher than or equal to a minimum rotational speed at which the sensorless control can be performed.

4. The control device according to claim 3, wherein in the torque increase control, drive of the electric motor is controlled such that a rotational speed of the electric motor starts to increase from the first rotational speed before hydraulic pressure at the discharge port increases by the specific control.

5. The control device according to claim 4, wherein a rotational speed of the electric motor is reduced to the first rotational speed after a lapse of a predetermined period of time from a start of the torque increase control.

6. The control device according to claim 5, wherein an instruction to start the specific control is provided after providing an instruction to start the torque increase control.

7. The control device according to claim 6, wherein the specific control is a control for switching the hydraulic circuit in order to change a destination of oil to be supplied, the oil being discharged from the discharge port.

8. The control device according to claim 6, wherein
the hydraulic control device includes:
  a discharge oil passage connected to the discharge port; and
  a hydraulic regulating valve provided in the discharge oil passage and regulating hydraulic pressure on an upstream side to set hydraulic pressure by emitting part of oil discharged from the discharge port to a downstream side, and
the specific control is a control for changing a hydraulic pressure instruction provided to the hydraulic regulating valve in order to increase the set hydraulic pressure.

9. The control device according to claim 6, wherein
the hydraulic control device includes a solenoid valve provided in an oil passage in the hydraulic circuit and regulating whether to supply hydraulic pressure to a downstream side, or hydraulic pressure supplied to a downstream side, and
the specific control is a control for changing a state of the solenoid valve.

10. The control device according to claim 1, wherein in the torque increase control, drive of the electric motor is controlled such that a rotational speed of the electric motor after an increase in hydraulic pressure at the discharge port is maintained higher than or equal to a minimum rotational speed at which the sensorless control can be performed.

11. The control device according to claim 1, wherein in the torque increase control, drive of the electric motor is controlled such that a rotational speed of the electric motor starts to increase from the first rotational speed before hydraulic pressure at the discharge port increases by the specific control.

12. The control device according to claim 1, wherein an instruction to start the specific control is provided after providing an instruction to start the torque increase control.

13. The control device according to claim 1, wherein the specific control is a control for switching the hydraulic circuit in order to change a destination of oil to be supplied, the oil being discharged from the discharge port.

14. The control device according to claim 1, wherein
the hydraulic control device includes:
  a discharge oil passage connected to the discharge port; and
  a hydraulic regulating valve provided in the discharge oil passage and regulating hydraulic pressure on an upstream side to set hydraulic pressure by emitting part of oil discharged from the discharge port to a downstream side, and
the specific control is a control for changing a hydraulic pressure instruction provided to the hydraulic regulating valve in order to increase the set hydraulic pressure.

15. The control device according to claim 1, wherein
the hydraulic control device includes a solenoid valve provided in an oil passage in the hydraulic circuit and regulating whether to supply hydraulic pressure to a downstream side, or hydraulic pressure supplied to a downstream side, and
the specific control is a control for changing a state of the solenoid valve.

16. The control device according to claim 2, wherein in the torque increase control, drive of the electric motor is controlled such that a rotational speed of the electric motor starts to increase from the first rotational speed before hydraulic pressure at the discharge port increases by the specific control.

17. The control device according to claim 2, wherein an instruction to start the specific control is provided after providing an instruction to start the torque increase control.

18. The control device according to claim 2, wherein the specific control is a control for switching the hydraulic circuit in order to change a destination of oil to be supplied, the oil being discharged from the discharge port.

19. The control device according to claim 2, wherein
the hydraulic control device includes:
  a discharge oil passage connected to the discharge port; and
  a hydraulic regulating valve provided in the discharge oil passage and regulating hydraulic pressure on an upstream side to set hydraulic pressure by emitting part of oil discharged from the discharge port to a downstream side, and
the specific control is a control for changing a hydraulic pressure instruction provided to the hydraulic regulating valve in order to increase the set hydraulic pressure.

20. The control device according to claim 2, wherein
the hydraulic control device includes a solenoid valve provided in an oil passage in the hydraulic circuit and regulating whether to supply hydraulic pressure to a downstream side, or hydraulic pressure supplied to a downstream side, and
the specific control is a control for changing a state of the solenoid valve.

* * * * *